United States Patent Office 3,490,849
Patented Jan. 20, 1970

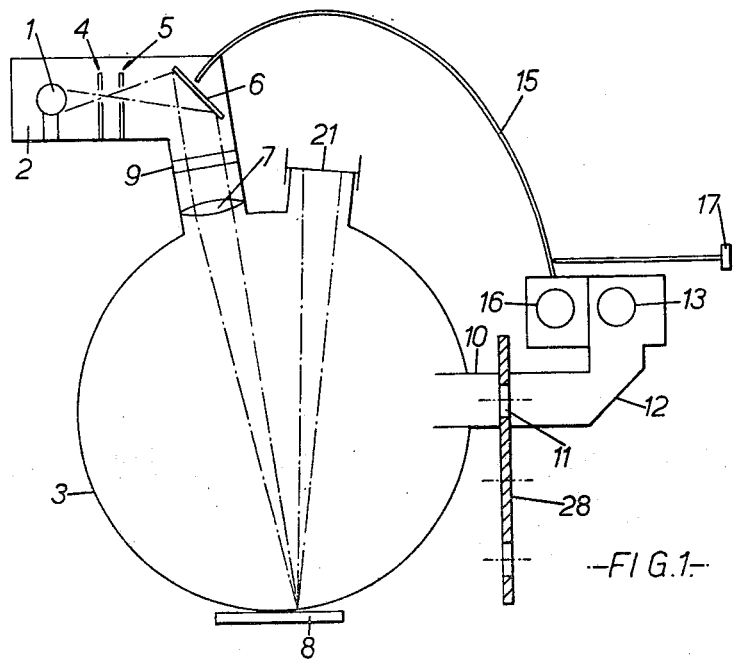
-FIG.1-
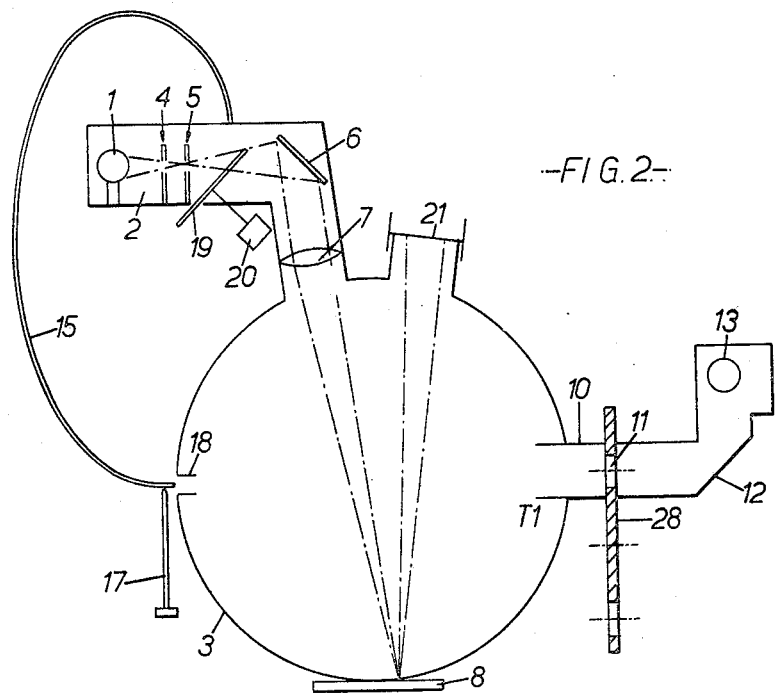
-FIG.2-
INVENTOR:
JAMES HAMBLETON

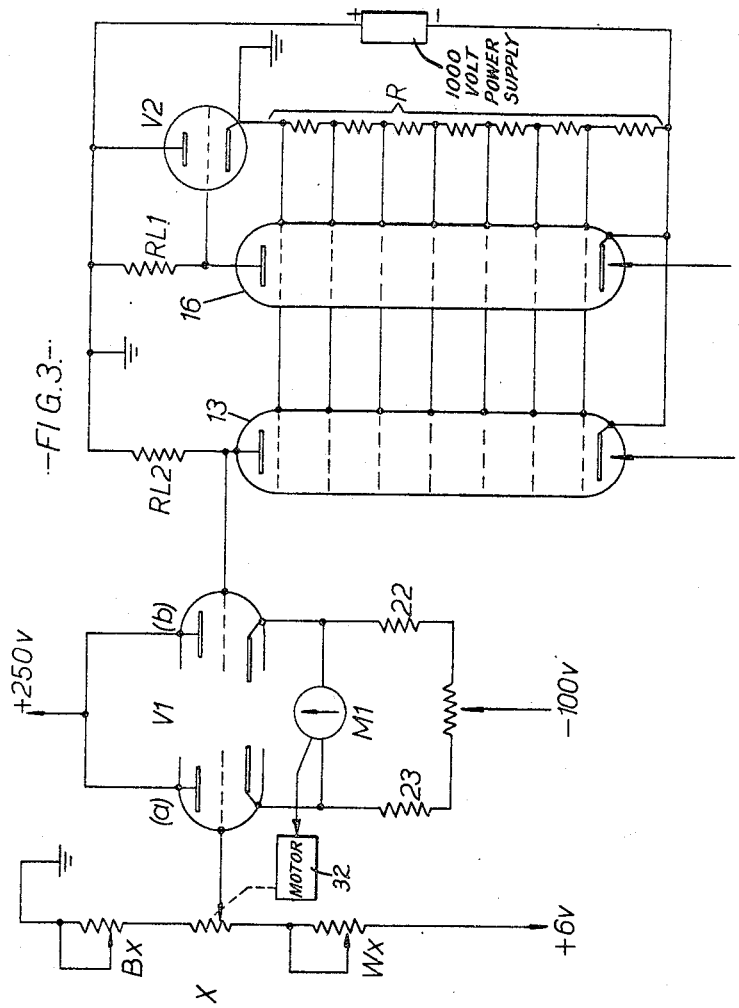
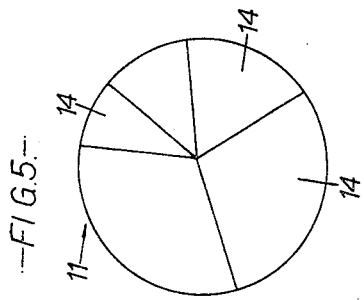

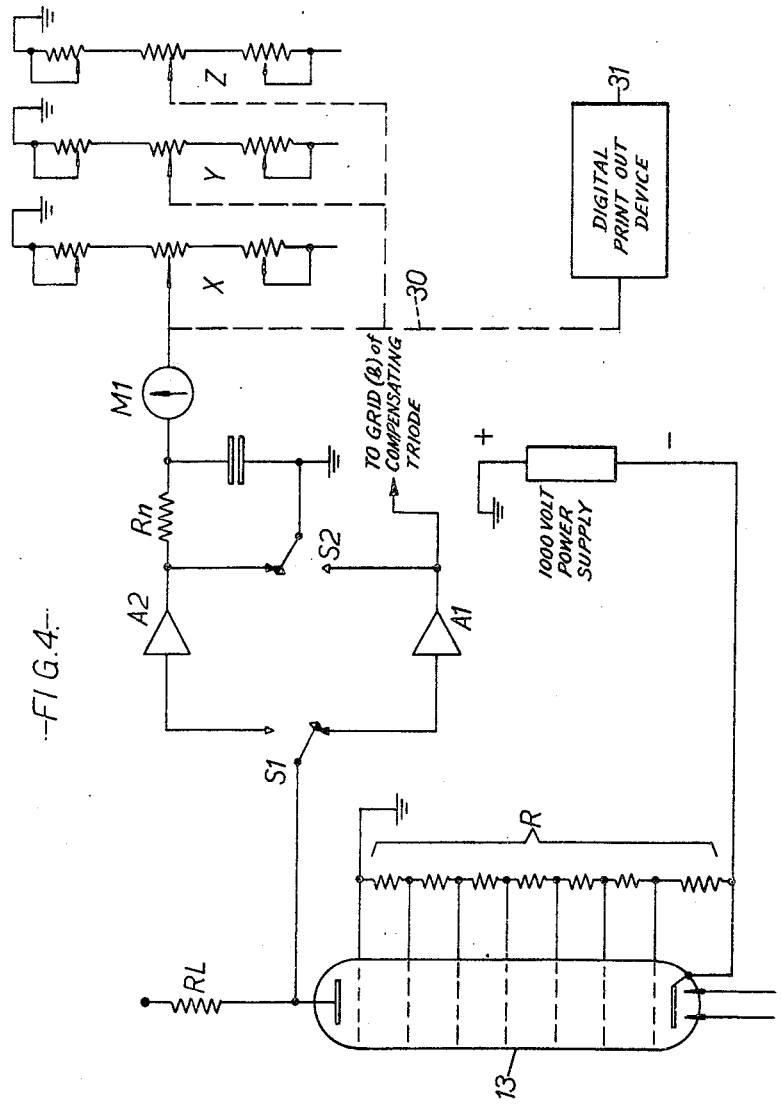
-FIG. 4.-

3,490,849
REGISTERING AND INTEGRATING SPHERE COLORIMETER
James Hambleton, Dunston, Gateshead, England, assignor to Joyce, Loebl and Company Limited, Gateshead, Durham, England
Filed Feb. 24, 1966, Ser. No. 529,723
Claims priority, application Great Britain, Mar. 4, 1965, 9,258/65
Int. Cl. G01j 3/46, 3/48; G01n 21/22
U.S. Cl. 356—176                                     9 Claims

ABSTRACT OF THE DISCLOSURE

A colorimeter wherein light from a sample is diffused in a sphere, passed through a filter located in an outlet tube and diffused a second time by a slant diffusing surface located between the filter and a photosensitive device which measures light impinging thereon.

---

Our invention relates to colorimeters, and has for its object the provision of a device for rapidly and accurately evaluating the colour composition of a sample or series of samples.

The invention is more particularly concerned with the provision of an integrating sphere colorimeter with means for illuminating a sample with white or ultraviolet light, and evaluating the coloured reflection or transmission by photometric means. The instrument consists essentially of an integrating sphere into which light from a suitable source is fed, the light passing through a sample or falling on a sample placed at the base of the sphere.

Light reflected from the sample or from the inner surface of the sphere passes through one section of a tricolour filter inserted in a tube extending radially from the sphere, the tube being bent so as to provide a scattering surface for the light emerging from the filter. This ensures that the photomultiplier "sees" a homogenous colour over the whole of its cathode surface. The output of the photomultiplier is connected to a load resistance across which is developed a voltage proportional to the light impinging on the photocathode surface. This potential is balanced against a voltage which is derived from an accurately wound potentiometer. Attached to the potentiometer shaft is a digit read-out dial, and the potential from the slider of the potentiometer is fed to one-half of a balancing triode to balance against the potential on the other half of the balancing triode which is connected to the photomultiplier load resistance. The digit read-out dial is calibrated to read directly the percentage reflectance or transmittance of the sample. Small preset correcting resistors are placed in series with the potentiometer such that irregularities in the response of the photometric system at each end of the range can be adjusted. This being a tri-stimulus instrument using basically three separate filters, it may use three separate potentiometers. It is therefore possible to set each potentiometer in turn to read the percentage light passing through each of the filters. The information is stored on the dials and read or printed only after completion of all readings. For differential colorimetry, i.e. the evaluation of a number of similar samples, the individual dials may only need to be moved a small amount, resulting in less fatigue to the operator, and less time per evaluation.

Variations in output of the light source due for example to variations in excitation voltage are compensated by allowing a portion of the light output to fall on a second photomultiplier, the output of which affects the colour measuring photomultiplier so as to compensate for variations of intensity of incident light.

In operation, one tricolour filter is inserted in the optical path between the sphere and the photomultiplier, and a potentiometer reading taken. The filter is then replaced by a second and a third, a reading being taken for each filter. An ultraviolet light source may be employed to cause the sample to fluoresce. The fluorescent radiation which is in the visible spectrum passes through the filter and is registered by the read-out dials.

The balancing circuit described above can be removed and a high-impedance input digital voltmeter connected directly to the photomultiplier anode. The supply voltages supplied to the photomultiplier are easily adjusted by means of changing the taps on a tapped resistor such as resistor R of FIGS. 3 and 4, such that the digital voltmeter can read directly the percentage values of reflectance. A conversion unit can be attached to the digital voltmeter or potentiometer which allows print out on punched tape or punched card. The conversion unit accepts the output voltage level from the potentiometer or voltages from the digital voltmeter which are a function of the photomultiplier output and electrically converts these signals to the proper codes required by the tape or card print out unit. The design of the conversion unit is within the skill of those ordinarily skilled in the data handling art and is not described herein so as not to unduly obscure the basic inventive concept disclosed herein.

In order to provide a set of tricolour filters conforming to those laid down by the C.I.E. Committee (Commission Internationale de l'Eclairage) we make each filter in the form of a multicoloured disc, the colours preferably being of sector form, the angle of each sector, its colour, its thickness and its saturation determining the amount and colour of light which it passes. Because of the infinite variability of such a construction, additive and subtractive methods of construction can be used, and a high degree of matching of each filter with an ideal colour and intensity curve is obtained. The use of the sector shape enables the filter to be used after a circular diaphragm, or even after an iris diaphragm of variable aperture. The three filters may be designed to compensate also for the colour response of the lamp, the integrating sphere, and the photomultiplier. It is also possible to design the filter to measure either in the 2° or 10° field of illumination. Filters can be designed for any desired pass band, for instance they have also been produced for the U.V.W. system.

As an alternative to the method of compensating for changes of incident light intensity described above, a single photomultiplier may be used, the cathode of which is alternately illuminated by light direct from the source and by sample-coloured light, the alternations taking place at, say, 50 cycles per second. The response signals are directed alternately and in synchronism to a compensating circuit and the measuring circuit, the first reacting on the second when variations of the light source occur to cancel corresponding variations of measuring current.

Although our invention has been described as using tricolour filters it should be understood that it is not necessarily so restricted; any desired number of narrow-pass band filters may be employed to evaluate the response curve of a particular sample with great accuracy, and a single register may be employed for all the filters, its reading for each filter giving a numerical assessment of the sample colour over the whole of the visible spectrum. Any such process may be automatically operated, the filters being substituted and the results printed without the intervention of an operator.

Finally the photometer may be used to measure the specular gloss component of a sample by fitting a gloss cap at that part of the sphere on which a mirror reflection of the light source would fall from the sample if the latter has a shiny surface. One side of the gloss cap reflects this light back into the sphere, and when reversed, the other side absorbs it, so that two such measurements give the specular gloss component of the sample.

According to our invention a colorimeter in which light from a source thereof is transmitted through or reflected from a sample to the interior of an integrating sphere, has a portion of the light therein passed through a light filter of predetermined characteristics to a measuring photoelectric device which actuates an indicator or digital recorder.

Reference should now be made to the accompanying drawings, in which:

FIG. 1 shows the construction of one embodiment of our invention;
FIG. 2 shows an alternative embodiment,
FIG. 3 is a circuit used in connection with FIG. 1.
FIG. 4 is a circuit used in connection with FIG. 2.
FIG. 5 is a disc filter.

From FIGURE 1 it will be seen that a light source 1 such as a filament lamp is located in a chamber 2, the latter opening into an integrating sphere 3 having an internally whitened surface. Light from the lamp passes through a stop 4 and a heat filter 5 to a mirror 6. The latter reflects the light through the focusing lens 7 into the sphere, where a spot is formed on a surface 8 located in an aperture in the sphere.

If the light transmission through a transparent or semi-transparent solid or liquid is to be measured, the sample is inserted in the light path at 9, in which case the surface 8 is matt white. If however the reflectance from a coloured surface is to be measured, the surface is located in the position 8, and no coloured material is located at 9, other than an illuminent conversion filter, for instance for illuminent A or B.

Light from the lens 7 falls only on the surface 8, and is reflected and/or diffused therefrom into the sphere, where its effect is integrated by the white surface. Some of this light passes up a light trap tube 10, the inner end of which is internally blackened, and then through a filter 11.

This filtered light is reflected by a matt white slanted diffusing surface 12 which ensures that the light transmitted to the photomultiplier 13 is of uniform colour all over the cathode.

The filter 11 may be one of a set of tricolour separation filters, in which case it is fitted on a revolvable mount 28 which also supports the other two filters, the mount being such that any one filter can be brought into the light path of tube 10.

Each filter is in the form of a multi-coloured disc as shown in FIGURE 5. The correct total colour shade is derived by making the filter from a number of sectors 14 each of different colour and density, the resultant total transmission of which may correct for colour of light source, photometer sphere reflectance, and colour sensitivity of the cathode of the photomultiplier.

In order to compensate for variations of intensity of the light source 1, a glass-fibre optical conductor 15 has one end located in a clear space in the mirror 6, the other end being placed so as to shine light on the cathode of a second photomultiplier 16. The output of this multiplier is used (see FIGURE 3), to compensate the output of the measuring photomultiplier 13.

If the gloss component of a sample is to be measured, it is located at the base of the sphere at 8; a gloss cap 21 is applied to a tubular neck on the sphere, the cap having one side reflecting and the other side black. Two readings are then taken, the cap being reversed between them. The gloss component of the sample can then be calculated from the difference of the readings.

The sensitivity of the device can be adjusted by a knob 17. This is connected to a graduated wedge insertable between the light conductor 15 and the cathode of the compensating photomultiplier 16, so that if required the light falling on this cathode can be reduced as for example in the ratio 10:1. This correspondingly increases the sensitivity of photomultiplier 13, so that the reflectance of dark samples can be readily measured.

FIGURE 2 shows an alternative arrangement using only a single photomultiplier for both measurement and light compensation. As before light from a lamp 1 passes through a stop 4 and a heat filter 5, being reflected from a mirror 6 through lens 7 to a sample surface 8. Light is reflected and/or diffused therefrom into the sphere 3, from which some light enters tube 10, passes through filter 11 and is diffused by surface 12 onto the cathode of multiplier 13. In the present case a rotating mirror-shutter 19 driven by a motor 20 is interposed between components 5 and 6. Half of the shutter is cut away to allow light to pass over the path described above. The remaining half is silvered and reflects light to one end of the conductor 15. The other end shines light into the sphere 3 via a trap 18 which prevents this light from falling on surface 8, but allows it to traverse via the sphere to the cathode of the multiplier 13, which thus receives light alternately from the sample and from the conductor. A switching circuit driven synchronously with the shutter 19 directs the multiplier output either to a measuring circuit or to a compensating circuit as described below.

Referring to FIGURE 3, it will be seen that the photomultiplier 13 has its anode and cathode connected to a source of high voltage, and the output from the anode 13 is connected to one-half of a balancing triode V1($b$). The balancing triode V1 and its associated circuitry comprise a well known type of comparator circuit. The other half of the triode is connected to a self-regulating, motor driven, potentiometer X. When the light falling on the cathode of the photomultiplier is received from the sample the resulting anode current varies the potential across resistance RL2 so that the cathode current of V1($b$) is adjusted proportionally to the intensity of this light. This varies the current through the cathode resistance 22 and so moves the pointer of the meter M1, which in this embodiment is a contact-making meter, from a central position. The design of such meters is well known in the art and the details thereof are not shown in the drawings. The contacts on the meter (not shown) energise the motor 32 of the potentiometer X by means not shown in detail in such a direction as to vary the current through the other half of the balancing triode V1($a$) so that the potential across resistance 23 becomes equal to that across resistance 22, thus restoring the meter to a mid-position and stopping the motor of the potentiometer X. This potentiometer position may be indicated on a dial. The potentiometer may be mechanically coupled to a digital read-out device to provide a digital reading of its position. The voltage output of the potentiometer may be fed to an analog to digital converter, the output of which is connected to an electrically operated readout to provide a digital reading of the position of the potentiometer.

Alternatively, the device may be electrically or mechanically connected to a print-out mechanism which converts the position of the potentiometer to the required format to provide a print out in a manner well known to those skilled in the art. The potentiometer X has two preset resistors WX and BX connected in series with it, adjustments to which are made to compensate for the "white" and "black" settings of the potentiometer.

In order to compensate for variations in the output of the lamp 1, reference light from the conductor 15 falls on the cathode of the photomultiplier 16. This causes a current to flow through the photomultiplier and through the resistance RL1 causing a potential drop across this resistor. This potential is applied to the grid of triode V2 and it will be assumed that the voltage drop across this triode is substantially equal to that across its cathode resistor R, which as shown has tappings connected to the dynodes of both the photomultipliers 13 and 16, these latter being selected so as to have similar characteristics. By adjustment of the sensitivity control 17 (FIGURE 1) the amount of the voltage drop across RL1 can be controlled. Assuming again that this voltage drop is of the order of 6 volts, then the grid of V2 is biased to —6 volts and under this condition the resistance of the valve V2 is equal to the resistance R. RL2, the anode resistor of photomultiplier 13, is made equal to RL1, and since the characteristics of the two photomultipliers are identical, then the voltage drops across these two resistors are also equal.

If the intensity of the reference light changes for example due to ageing of the lamp, the light passing through the conductor 15 is reduced, and since this reduces the light falling on the cathode of the multiplier 16, this reduces its anode current. This in turn lowers the voltage drop across RL1, and hence the bias applied to V2, so that the resistance of this valve is lowered, and its potential drop decreases. The voltage across the resistor R increases correspondingly, stepping up the voltages applied to the dynodes of the photomultipliers. Since their sensitivity increases with increase of voltage, the currents through the multipliers also increase so as to restore them substantially to their original values. By this means the white and black standardised settings for the photomultiplier 13 are controlled and stabilised for changes of the light emitted by the lamp 1; variations of current through resistor RL2 therefore only take place because of variations in sample reflectivity or transmission, and these variations are the only ones which are required to be measured by the balancing triode V1.

If a white sample is placed in the sample port 8, conditions can be adjusted such that, say, 6 volts are developed across resistance RL2. Since this voltage is applied to half of the troide V1($b$), it is necessary to apply the same voltage to the grid of V1($a$) to balance the meter M1. Small variations in this 100% light level can be compensated for by adjusting the "white" setting resistor WX. If now a black sample is placed in the sample port 8, and provided that the photomultiplier 13 has zero noise current, its anode rises to zero or earth voltage since substantially no light reaches its cathode and hence its impedance is very high. This causes movement of the slider of potentiometer X to the other extreme of its travel in order to balance the potential applied to the grid of V1($b$). In practice however the multiplier 13 developes a small amount of electronic noise, and this gives a minute drop across the resistance RL2. To compensate this, the small preset resistor BX is included in series with potentiometer X and is set to compensate for the photomultiplier noise. Replacement of the black and white samples by a sample to be measured, enables the instrument to read accurately the true percentage of light reflected from the sample.

The circuit of FIGURE 3 shows means for measuring the reflectance of a sample with a single filter 11. If a three-colour reading, or three-colour plus neutral readings are to be taken, then the filter holder 28 is provided with rotational means and the circuit of FIGURE 3 is repeated a number of times, one circuit for each filter. After a reading has been taken for a single filter, the holder 28 is rotated to bring the next filter into position, the additional circuits being switched in one after another automatically in synchronism with the filter holder 28. Each circuit is of course compensated and balanced individually before a set of readings is taken.

FIGURE 4 shows an outline circuit for use in connection with the apparatus in FIGURE 2. Here the switches S1 and S2 are operated synchronously with the position of the mirror-shutter 19 so that the photomultiplier is connected either to amplifier A1 or to amplifier A2, dependent on whether reference light or sample light is being received.

When light passes through the blank section of the shutter 19 (FIGURE 2) and then onto the sample, switch S1 connects the output of the photomultiplier 13 across the resistance RL to amplifier A2. At this time switch S2 grounds the output of amplifier A1 to ensure that no spurious signals are emitted by this amplifier. The amplifier A2 thus controls the measuring circuit and meter M1 to indicate the value of the light reflected from the sample. During the next half of the light cycle, the rotating mirror shutter reflects light from the lamp into the conductor 15 and then to the cathode of the photomultiplier 13 via the sphere 3 and the filter 11, this light being shut off from the sample 8 by the trap 18. The switches S1 and S2 are simultaneously changed over so that switch S1 applies the output of the photomultiplier 13 to amplifier A1, and the output of this amplifier is applied to a grid ($b$) of a compensating triode, which is similar in construction to the triode V1 shown in FIGURE 3. During this period switch S2 short-circuits the output from amplifier A2 to ensure that no spurious signal appears. By switching alternately at a rapid rate between these two positions, mean values of outputs appear across both A1 and A2, the output from amplifier A1 being proportional to the intersity of the lamp 1, while the output of A2 is controlled by the transmission or reflection of the sample.

Adequate stabilisation of the photomultiplier characteristics can be achieved in this way, and in fact the circuit is preferable to that shown in FIGURE 3 since the same multiplier both measures and compensates. This avoids the need for selecting two multipliers of similar characteristics. The circuit shows the sliders of the potentiometers X, Y and Z as being mechanically connected through the dashed line 30 to a digital print out device, the same device being used in connection with each potentiometer in turn. Thus if the print-out device prints on a strip of paper, it is preferred to print, say, three sets of figures across the paper corresponding to the three-colour response of the sample, and then if a series of samples is to be measured, the strip is advanced by one space and the response of the next sample printed, again in a line. If the samples are all of substantially the same kind, then the use of three potentiometers and measuring circuits in sequence for each sample ensures that the minimum re-adjustment of each potentiometer is required in passing from one sample to the next, so that the print-out time can be kept low. The printout unit can also be applied directly to the output of A2 (FIG. 4) and the X, Y, Z potentiometers can be discarded. The load R$n$ must then be switched and include small adjusting resistors in series to set the black and white levels.

I claim:
1. An integrating sphere colorimeter comprising a spherical chamber having an inlet aperture for transmitting a light beam from a light source and an outlet aperture for extracting light from the interior of the spherical chamber; means for locating a sample relative to said inlet aperture such that the light from said light source falls upon the sample and then into the interior of the spherical diffusing chamber; photoelectric means for detecting light from said chamber and for providing an electrical signal proportional to said light; a light conducting exit tube extending outwardly from said outlet aperture; a compound filter located in said light conducting exit tube; a slant matte white reflective diffusing surface across the outwardly extending end of said light conducting exit tube for receiving light passed through said filter and reflecting said light to said photoelectric means ensuring that said light is of uniform color all over the photosensitive element of said photosensitive means; and means connected to said photoelectric means for utilizing the electrical signal output of the said photoelectric means.

2. A colorimeter as recited in claim 1 wherein said sample is opaque, a third aperture is provided in said sphere and said locating means locates said sample at said third aperture such that light from said source is reflected from the surface of said sample into said sphere.

3. A colorimeter as recited in claim 1 the sample is transparent, and said locating means locates said sample between said light source and the interior of said sphere.

4. A colorimeter as recited in claim 1 the photoelectric means is a first photomultiplier, and comprising a high-voltage source, a tapped resistor connected to said source and to the dynodes of said photomultiplier, a resistor in the anode circuit of said photomultiplier, and means for deriving a light-intensity reading from the potential across said anode resistor.

5. A colorimeter as recited in claim 4 comprising a second photomultiplier, a light path from said light source to said second photomultiplier, connections from said high-voltage source to said second photomultiplier, connections from the anode circuit of said second photomultiplier to a compensating circuit, and connections from said compensating circuit to said first photomultiplier whereby the output thereof is compensated for variations in output of said light source.

6. A colorimeter as recited in claim 4 comprising a gapped mirror-shutter in the light path from said light source to said sphere, means for rotating said shutter, means for directing light from said sphere and from said mirror-shutter alternately to the cathode of said first photomultiplier, means for directing the output of said photomultiplier alternately and synchronously with said shutter to a measuring amplifier and a compensating amplifier, and means inter-connecting said amplifiers to correct the output of said measuring amplifier by said compensating amplifier for variations in output of said light source.

7. A colorimeter as recited in claim 4 further comprising a potentiometer, the slider thereof being adjustable by motor means, a comparator, means connecting said comparator to said potentiometer and said photomultiplier anode circuit resistor, means for moving said slider by said motor means under control of said comparator to equalise potentials derived from said slider and said anode resistor, and digital indicating and printing means set by said slider position.

8. A colorimeter as recited in claim 1 wherein said filter includes a plurality of light filter, and said measuring means includes a like plurality of measuring means, and further comprising means for inserting said filters sequentially in said exit tube and for simultaneously connecting and measuring means sequentially in the output of said photosensitive device, each of said measuring means being always associated with a particular one of said filters.

9. A colorimeter as recited in claim 8 wherein each measuring means comprises a comparator, self-balancing potentiometer, means for driving the slider of said potentiometer in accordance with the output of said camparator, and means for printing a digital reading corresponding to the position of said slider.

References Cited

UNITED STATES PATENTS

| | | |
|---|---|---|
| 1,964,365 | 6/1934 | Razek. |
| 2,263,938 | 11/1941 | West. |
| 2,474,098 | 6/1949 | Dimmick. |
| 2,544,196 | 3/1951 | Varden. |
| 2,565,265 | 8/1951 | Peterson _____ 250—207 |
| 2,678,725 | 5/1954 | Jacobson. |
| 2,824,672 | 7/1958 | Thomsen. |
| 3,207,996 | 9/1965 | Sundstrom. |
| 3,340,764 | 9/1967 | Bergson. |
| 3,300,646 | 1/1967 | Casebeer _____ 250—228 |
| 3,329,821 | 7/1967 | Lesage. |
| 3,364,811 | 1/1968 | Baruch et al. |

FOREIGN PATENTS 71,977  2/1958  Netherlands.

OTHER REFERENCES

"Photometry," J. W. T. Walsh, Constable & Co. Ltd., London, 1958, pp. 437–8.

"Construction of the General Electric Spectrophotometer," J. L. Michaelson, J.O.S.A., vol. 28, October 1938, p. 365.

"Measurement of Plane Surface Finish by Photometry," J. M. Peters, Michrotecnic, vol. VIII, No. 3, pp. 119–120.

"Callier Q of Motion Picture Emulsions," J. Streiffert, J.S.M.P.E., vol. 49, #6, 508–509.

"Hunter Lab Model D–16 Multipurpose Glossmeter," a brochure of Hunter Assoc. Lab., Inc., McLean, Va., October 1961, 2 pp.

Gardner & Sward, "Paint Testing Manual," 12th ed., March 1962, pp. 3–8, dist. by Gardiner Lab., Inc., Bethesda, Md.

RONALD L. WIBERT, Primary Examiner

R. J. WEBSTER, Assistant Examiner

U.S. Cl. X.R.

250—207, 226; 356—188, 206, 212, 222, 226